United States Patent [19]

McCullough, Jr. et al.

[11] Patent Number: 5,312,678
[45] Date of Patent: May 17, 1994

[54] CAMOUFLAGE MATERIAL

[75] Inventors: Francis P. McCullough, Jr.; Leo R. Novak, both of Lake Jackson, Tex.; David M. Hall, Auburn, Ala.

[73] Assignee: The Dow Chemical Company, Midland, Mich.

[21] Appl. No.: 418,045

[22] Filed: Oct. 6, 1989

[51] Int. Cl.⁵ .............................. D03D 3/00
[52] U.S. Cl. .................... 428/225; 428/284; 428/288; 428/408; 428/919; 428/246
[58] Field of Search ............ 428/288, 225, 284, 408, 428/919, 246

[56] References Cited

U.S. PATENT DOCUMENTS

| | | |
|---|---|---|
| 3,733,606 | 5/1973 | Johansson . |
| 4,034,375 | 7/1977 | Wallin . |
| 4,479,994 | 10/1984 | Berg . |
| 4,581,284 | 4/1986 | Eggert et al. . |
| 4,621,012 | 11/1986 | Pusch . |
| 4,844,974 | 7/1989 | McCullough et al. ............ 428/288 |
| 4,868,037 | 9/1989 | McCullough et al. ............ 428/222 |

Primary Examiner—James J. Bell

[57] ABSTRACT

A structure is provided comprising carbonaceous materials for absorbing and/or reflecting radiated energy or electromagnetic energy. The structure is useful for camouflage or for shielding electromagnetic radiation, especially microwaves.

28 Claims, 2 Drawing Sheets

CAMOUFLAGE MATERIAL

FIELD OF THE INVENTION

The invention relates to camouflage materials having good flexibility and which are effective in defeating detection devices operating over a wide spectral range. More particularly the invention relates to the use of non-flammable carbonaceous materials to provide a wide energy band of acoustic, heat and radar signature reduction of equipment and installations. The invention further provides a means for providing ignition resistance or fire resistance to camouflage structures.

BACKGROUND OF THE INVENTION

Camouflage material which is presently being produced for military use, particularly in the United States, has been developed to the stage at which it is capable of defeating most detection devices. However, radar devices capable of transmitting over different wavelengths are being developed. Coatings have been developed which are capable of presenting a visual appearance closely resembling any of a number of possible environments in which the camouflage is to be used, e.g., woodland regions, snowy regions, desert areas, and the like. In any or all of these environments, it is frequently desirable to also use the camouflage to provide suitable shielding against electromagnetic radiation, such as for example that used by radar or infrared (I.R.) devices, or the combination of the two. The term, "radar device", is used to include an apparatus capable of transmitting and receiving electromagnetic energy in any one of a number of wavelengths or bands including visual and radio broadcast waves.

If the material to be developed into a camouflage structure is to be radar defeating, a common practice is to provide a substrate with a plurality of electrically conductive fibers or fibrils, these being typically either metal, such as stainless steel, or elemental carbon in the form of graphite fibers. A common material now being used includes a spun-bonded, non-woven fabric wherein one surface has adhered a plurality of randomly oriented metal fibrils. The non-woven fabric with the fibrils attached is then coated or laminated, usually on both sides, with a film or layer of a polymeric material, commonly polyvinyl chloride. The polyvinyl chloride (PVC) itself may be impregnated or filled with pigment, as disclosed in U.S. Pat. Nos. 4,034,375 and 4,435,465, to impart to the resulting material the desired responses in the visible or near visible electromagnetic radiation spectra, particularly visible, infrared and ultraviolet regions. Alternatively, the polyvinyl chloride can be further coated with a pigment-containing coating or paint to achieve a desired optical response characteristic.

While the resulting product is generally suitable as a camouflage structure, certain disadvantages have appeared. One of these is that the radar reflectance characteristics initially built into the camouflage structure by virtue of the random disposition of metal fibers has a tendency to change when the finished camouflage structure is handled, crinkled, folded, or otherwise flexed in normal usage. The reason for this change in radar characteristics is not fully understood, but it has been established that different characteristics appear in the vicinity of the folds where broken particles accumulate and that, as a result, the camouflage can be distinguished by suitable radar analysis from the surrounding environment. Also, breakage of the semiconductors or other conductive materials creates a change in continuity and contact resistance so that there are absorption changes that may result in detection.

U.S. Pat. No. 4,495,239, discloses a camouflage structure, effective in the spectral range from visible light to radar waves, which comprises a base layer coated with a homogeneous metal layer reflective in the range of terrestrial thermal radiation as well as in the radar region of the spectrum (3 megahertz to 3,000 megahertz). The structure also has a surface resistivity of not more than 0.5 to 10 ohms per square cm and a subsequent coating of a camouflage paint containing pigments having reflective properties in the visible and near IR spectral regions that are similar to the natural background. A binder having high transparency in the 3–5 microns ($\mu$m) and 8–14 $\mu$m atmospheric windows of the far infrared, region of the spectrum is provided. The paint is applied so that its emissivity in those regions will vary over the surface of the material.

British Patent No. 1,605,131, discloses thermally structured camouflage materials having a surface which is highly reflective in the far infrared region of 3–5 $\mu$m and 8–14 $\mu$m. The structure has a coating of a camouflage paint containing a pigment having camouflage properties in the visible and near IR range. The structure further contains a binding agent having an emissivity less than 90% in the 3–5 $\mu$m and 8–14 $\mu$m range. The emissive power is structured in various ways so that it varies over the surface of the structure.

U.S. Pat. No. 3,733,606 addresses the problem of detection by radar by using a camouflage structure consisting of a multi-layered material for absorbing and reflecting signals for defeating radar waves transmitted over different frequencies. At least one layer is a thin, non-homogeneous electrically conducting film and the other layers assist in providing both a two dimensional and three dimensional effect.

U.S. Pat. No. 4,479,994 discloses a flexible, quilt-like multispectral camouflage blanket which functions as a radar absorber and also suppresses thermal and acoustical energy. The fabric material utilized is KEVLAR, polyvinyl chloride or SCRIM textiles.

U.S. Pat. No. 4,837,076 to Mc Cullough et al, which is herein incorporated by reference, discloses a class of carbonaceous fibers having the different degrees of electrical conductivity which may be used in the present invention.

U.S. Pat. No. 4,857,394, to Mc Cullough et al, which is herein incorporated by reference, discloses a class of fluorinated carbonaceous fibers which may be utilized in the camouflage structures of the invention.

It is understood that the term "web" as used herein is intended to define a textile fabric which for simplicity is intended to include knitted, woven and non-woven textile materials mats, battings, laminates, and the like.

The term "structure" as herein utilized is intended to mean a construction or arrangement of one or more physical or textile elements or materials into a complex entity, for example camouflage blankets, tents, webbing, nets and the like.

The term "carbonaceous materials" include carbonaceous fibers, foams, sheets, films or the like having a carbon content of greater than 65%.

The term "graphitic" as used herein relates to those carbonaceous materials having an elemental carbon content of at least about 92%, preferably, about 98%, and as further defined in U.S. Pat. No. 4,005,183 to Singer, which is herewith incorporated by reference.

It is to be understood that the percentage stated relate to percent by weight of the total composition unless stated otherwise.

SUMMARY OF THE INVENTION

Generally, the present invention relates to the use of carbonaceous materials in camouflage structures which will be effective for defeating detection devices used in the spectral range from visible light to radar waves. Advantageously, the camouflage structure may comprise carbonaceous materials, particularly fibers, as the effective components or the carbonaceous materials may be incorporated into existing structures with conventional materials. It has been found that carbonaceous fibers when blended with other fibers provides synergistically improved ignition resistance and fire resistance to the combination as disclosed in copending application Ser. No. 333,530 of Mc Cullough et al.

The carbonaceous materials utilized have a limited oxygen index (LOI) at least 40 when tested according to the test method of ASTM D 2863-77, which is incorporated herein by reference. The carbonaceous materials include linear and/or non-linear fibers with the proviso that when the fibers are graphitic they are non-linear and/or fluorinated.

The non-linear carbonaceous fibers used in the invention have a reversible deflection ratio of greater than about 1.2:1 and an aspect ratio of greater than about 10:1. When the fibers are graphitic and non-linear they have greater flexibility, and resistance to breaking and abrasion as compared with linear graphitic fibers of the prior art. Other carbonaceous fibers which may be utilized are the metal coated fibers disclosed in copending application Ser. No. 366,804 filed Jun. 14, 1989, which is incorporated herein by reference.

In accordance with one embodiment of the invention, there is provided a flexible structure having radar defeating detection by radar devices for use as camouflage. The structure comprises: 1) a first flexible electrically non-conductive layer of carbonaceous fibers and, 2) a second flexible electrically conductive layer of carbonaceous fibers for absorbing electromagnetic waves.

The structure provides a reduction in acoustic, thermal and radar signature of possible military targets. The structure is especially useful in connection with mobile military targets, such as tanks, trucks and other such vehicles because the camouflage can be easily spread over the target.

Advantageously, the carbonaceous fibers are formed or blended with a pliable thermoplastic to provide a flexible non-woven fabric. The non-woven fabric can form a camouflage structure using one or more plies of the fabric. The plies may be comprised of about 10 to 90% by weight of the carbonaceous fibers, preferably 10 to 70% by weight. However, the amount utilized is dependent upon the particular use and other materials that may be incorporated within the structure.

The structure may include a bottom layer of radar reflective material so as to reflect any electromagnetic waves which pass through.

Optionally, the structure on its upper surface may be provided with a layer of camouflage cloth, scrim or paint.

Through the use of different plies or layers it is possible to provide a structure to absorb radar waves over a given band width by phase cancellation techniques. A ply can be added which is specific for infrared radiation. The use of non-linear fibers inherently produces a three dimensional effect so as to provide multi-angular absorption of the radiated waves.

Accordingly, it is an object of the present invention to provide a base material for use in camouflage structures which is flexible and which retains its radar defeating capabilities after being flexed and folded.

It is another object of the invention to provide material for use in camouflage structures that is effective over a spectral range up to about 100 gigahertz.

It is still a further object of the invention to provide camouflage material which provides wide band visual, acoustic, heat, I.R., and radar signature reduction of protected equipment which is stationary or in motion.

These and other advantages of the invention will become more apparent from the following detailed description and the drawings.

DETAILED DESCRIPTION OF THE PREFERRED EMBODIMENTS

Figure 1:
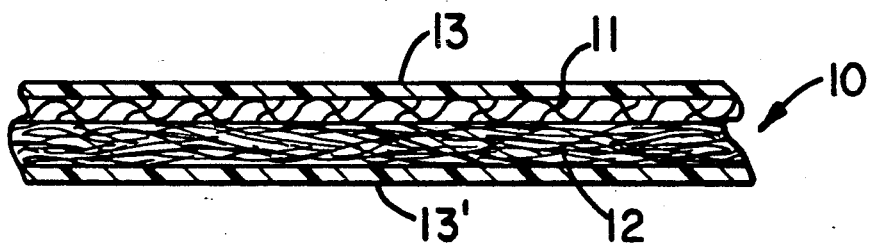
FIG. 1 is an elevational view, in section, of a camouflage structure of the invention.

As shown in FIG. 1, a camouflage blanket 10 may be provided having a plurality of plies or layers of energy absorbing webs 11 and 12 for target signature reduction by absorbing incident radar waves and preventing heat and sound emanating from the protected equipment from reaching the upper surface of the blanket.

The blanket 10 comprises an electrically conductive fabric layer 11 of carbonaceous fibers for absorbing radar waves. A second layer 12 comprises a mat or batting of radar absorbing carbonaceous material. The mat or batting 12 is comprised of non-linear fibers so as to also function as a sound and thermal barrier. Optionally, discreet and/or magnetic particles dipole material may be randomly distributed throughout the layers.

The support fabric 13, 13' is preferably a material of suitable strength with a low dielectric constant, for example, KEVLAR, polyvinyl chloride, nylon, water resistant celluloses or the like. Such materials inherently resist water, abrasion various forms of contamination, and in some cases, fire resistance.

The layer 13 may optionally be provided with a camouflaging about 10-100 mm thick, which contains inorganic metal compounds such as metal oxides and metal salts. Typically, said metal compounds are chromium oxide green, chromium oxide, hydrate green, titanium dioxide, iron oxide, zinc oxide, lead dioxide and ultramarine blue.

Figure 2:
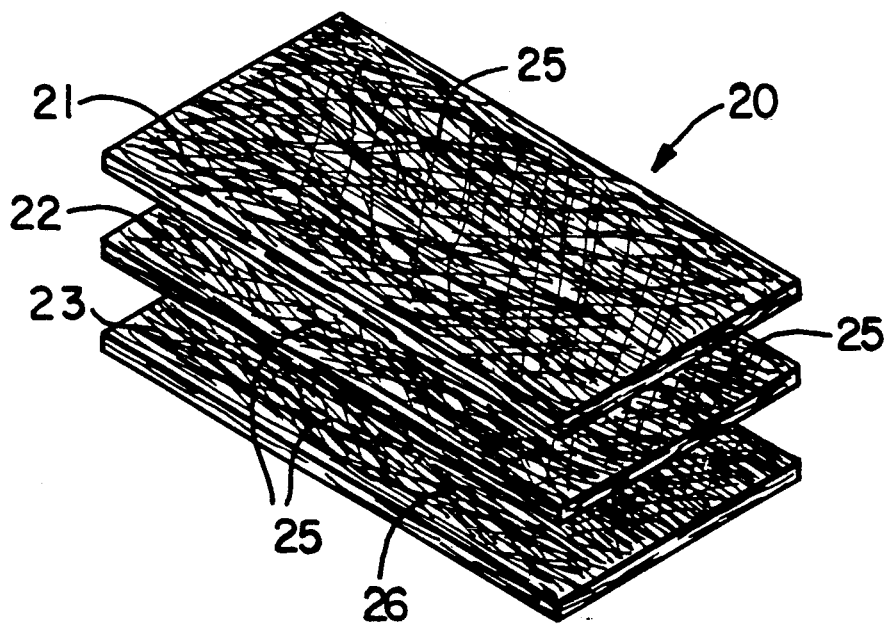
FIG. 2 shows a multi-layer camouflaging sheet.

FIG. 2 shows a flexible camouflage means 20 comprising a plurality of plies or layers 21, 22, 23. The two outside layers 21, 23 may be made to cause a three dimensional effect for radar radiation by utilizing non-linear carbonaceous fibers 25 to provide differing angles of both incident and reflected waves. The layers 21, 22, 23 may be made of varying densities to provide different degrees of attenuation or the fibers 25 may comprise a mixture with fluorinated and/or metallized carbonaceous fibers.

The intermediate layer 22 includes the electrically conductive radar absorbing carbonaceous fibers 25. The fibers preferably have a diameter of approximately about 4 to 20 microns and various lengths of about a half-wavelength within the desired radar wavelength interval of, for example 1.5 to 30 cm. The fibers preferably have a total length of about 300 to 500 meter per square meter of the sheet and an average spacing of approximately 5 mm from one to another. Of course, the majority of the fibers are crossed by one or more other fibers. The fibers in the intermediate layer 22 may include fluorinated fibers 26.

Figure 3:
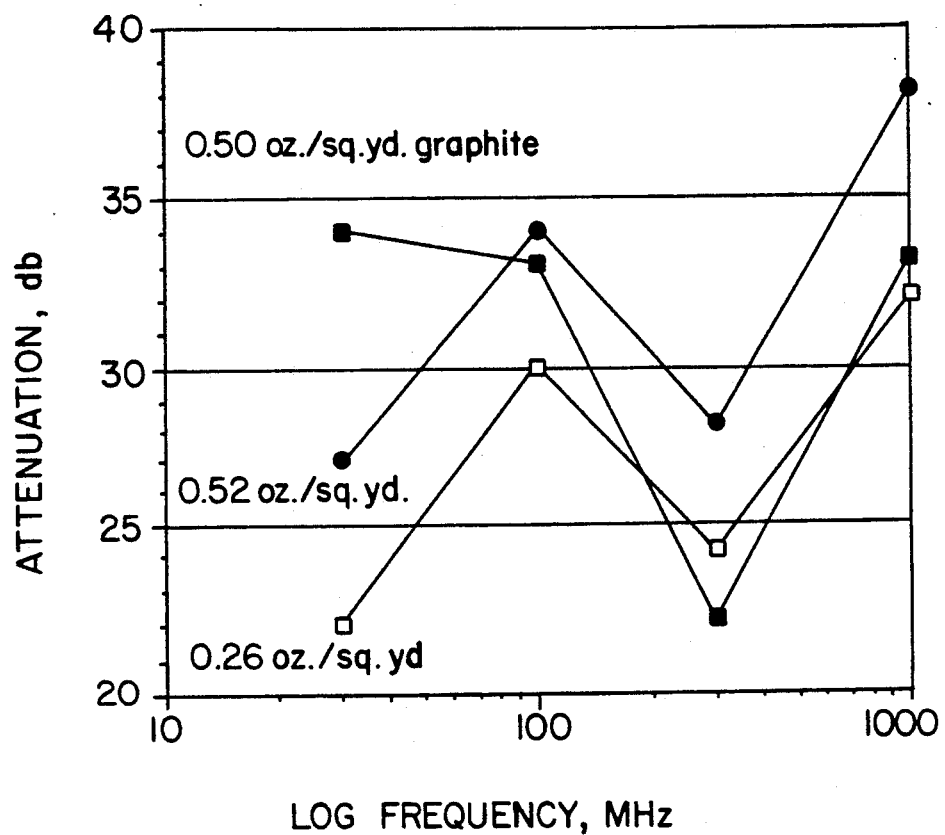
FIG. 3 is a graph showing the attenuation of non-linear non-graphic fibers as compared with linear graphite fibers.

FIG. 3 shows non-linear non-graphitic fibers in the form of a fiber veil which provides an attenuation similar to that of linear graphitic fibers.

The pliable thermoplastic base used is preferably polyvinyl chloride, polyamide, polyethylene, polypropylene or polyester or the like.

The radar absorbing layer may include 5-10 percent by volume of randomly distributed dipole materials (not shown) having semiconductive properties.

The dipole materials may be semiconducting materials such as silicon, germanium, fluorinated carbonaceous fibers, graphite doped carbon fibers, selenium, cuprous oxide, lead sulfide, silicon carbide, lead telluride, gallium arsenide and indium antimonide. Fluorinated fibers are preferred. Also, there may be normally conductive materials having a hair-like thickness so that they act as semiconductors or magnetic particles such as ferrite. Examples of such materials are aluminum, stainless steel, copper, silver and gold. The semiconductive materials are suitable rod-like in shape and have a length which is about one-half the wavelength of the radar waves to be absorbed. They should be flexible enough to bend elastically with bending of the laminate during use of the camouflage materials. The normally conductive materials may also be in the form of a vapor deposited coating 1 to 5 $\mu m$ in thickness on plastic strips about half the wavelength of the radar waves to be absorbed. Such semiconductors as silicon and germanium, could also similarly be deposited on such plastic strips. The metallic material may also be in the form of plastic coated wires as is now being utilized in some camouflage materials.

It is understood that the respective randomly distributed dipole materials are carefully chosen in combination so as to provide the lowest dielectric constant, or lowest reflectivity. Also, the thicker the panels the better will be the absorption of off-normal incident radar waves and the improvement in thermal and acoustic responses.

The carbonaceous fibers which are utilized in the structures of this invention may be classified into three groups.

In a first group, the carbonaceous fibers have a carbon content of greater than 65% but less than 85%, are essentially electrically nonconductive, and do not possess any electrostatic dissipating characteristics, i.e., they are not able to dissipate an electrostatic charge. These fibers may be utilized for attenuation of I.R.

The term electrically nonconductive as utilized in the present invention relates to a resistance of greater than $4 \times 10^6$ ohms/cm ($10^7$ ohms per inch) when measured on a 6K (6000 filaments) tow of fibers having a single fiber diameter of from 4 to 20 microns. The specific resistivity of the carbonaceous fibers is greater than about $10^{-1}$ ohm-cm. The specific resistivity of the fibers is calculated from measurements as described in U.S. Pat. No. 4,837,076.

When the fiber is a stabilized and heat set acrylic fiber it has been found that a nitrogen content of about 18% or higher results in an electrically nonconductive fiber.

In a second group, the carbonaceous fibers are classified as being partially electrically conductive (i.e., having a low conductivity) and having a carbon content of greater than 65% but less than 85%. Low conductivity means that a 6K tow of fibers in which the precursor fiber have a single fiber diameter of from 4 to 20 microns, has a tow resistance of from about $4 \times 10^6$ to $4 \times 10^3$ ohms/cm ($10^{-1} - 10^7$ ohms per inch).

In a third group are the fibers having a carbon content of at least 85%. These fibers are characterized as having a high electroconductivity. That is, the fibers are substantially graphitic and have a specific resistivity of less than $10^{-1}$ ohm-cm.

The electrical conductivity of the fibers may also be varied by varying the aspect ratios, length/diameter (l/d), of the fibers or by doping with a suitable substance such as arsenic, germanium, and the like.

The graphitic and the non-graphitic carbonaceous fibers of the three groups may be fluorinated as disclosed in aforementioned U.S. Pat. No. 4,857,394 so as to provide flexible fibers of different electrical conductivity having a non-electrically conductive surface.

The carbonaceous fibers may be used alone or blended with other synthetic or natural fibers. Preferable are the fibers which have been previously used as camouflage materials as herein before described.

The non-linear fibers utilized in the present invention either alone or in combination with other carbonaceous materials advantageously provides a three dimensional effect as a result of the apparent aspect ratios. As a result, a two-dimensional camouflage means having two-planar surfaces such as a normal tarpaulin or cover fabric, having incorporated therein non-linear fibers varies with the angle of incident visible and invisible light and with the angle of viewing the camouflaged object. Inter-reflective and differing angles of both incident and reflected waves will occur, and this involves also repeated absorption.

Also, carbonaceous non-linear fibers in combination with linear graphitic fibers provides an antenna-like effect.

Non-linear carbon or graphitic fibers used in the present invention further provide the additional advantage that they possess greater elongatability than linear carbon or graphite fibers. Improved elongatability of up to 20% have been obtained with non-linear fibers. This feature provides improved processability of the fiber and resists breakage during manufacture and handling.

The metallized carbon fibers possess greater electrical conductivity than the non-coated carbon fibers. Moreover, the metallized non-linear carbon fibers can be processed better than metal fibers.

Carbonaceous foams and films may be employed to provide the different absorptions and reflection properties which may be consistent with the topography where the camouflage is used.

Beside its use in camouflage structures, the same carbonaceous materials can be used to provide a composite material for electromagnetic shielding. The function of electromagnetic shielding is to eliminate or at least reduce the amount of energy radiated into a certain space or the electromagnetic radiation emitted from a space. Shields of this type are variously required for avoiding extraneous diffusion into cables and electronic circuits, for suppressing unwanted broadcasts from monochromatic or even wide-band stations or even for personnel protection in the microwave range. The metallized form of the carbonaceous fibers is particularly of use in connection with microwave radiation. The shielding effect is more intensified when there is non-uniformity in the shielding material such as when a non-linear fiber is utilized.

Also a combination of metallized fibers and non-metallized fibers in a textile sheet form provides the optimum absorption and reflection and therefore a higher shielding effect.

Exemplary of the structures of the present invention is set forth in the following example:

EXAMPLE

Web material was made with 1½ inch staple of PANOX (oxidized polyacrylonitrile fiber obtained from R. K. Carbon Fibers, Inc.) heat treated at 550–650 degrees Celsius and from 6 inch cut tow of PANOX using heat treated at 950° C. The material was separated into a fiber web using a Shirley Lab Trash Analyzer in the ASTM Cotton Physical Testing Lab at the Textile Engineering Department at Auburn University. The 1½ inch staple material was used to make spun antistatic polyester yarn and knit cloth.

The 6 inch material heat treated at 950 degrees Celsius did not show much fiber breakage, i.e., the fibers in the web were mostly long fibers of about 6 inch in length.

Carded fibers from each of the variations described above were then further blended with either polyester or nylon fibers to give a final blend containing 0.1 to 10% by weight of carbonaceous fiber.

The blended materials produced above were then fabricated into 1) non woven cloth by carding or using air entanglement techniques such as a Rando Weber or, 2) spun into a yarn and fabricated into a cloth to produce a textile material which attenuated or absorbed microwaves and/or other forms of electromagnetic radiation.

The carbonaceous materials produced above are blended with either thermoset resins such as epoxy or thermoplastics such as polyethylene or polypropylene to form panels, sheets, films or fibrillated films or web composites.

The resultant produced material for the blends and composites were then used to either absorb and/or attenuate forms of electromagnetic radiation, such as, but not limited to, microwaves and/or radar.

We claim:

1. In a structure for absorbing and/or reflecting radiated energy or electromagnetic radiation, the improvement which comprises 1) means for absorbing incident radar waves for reducing target signature and 2) at least one layer of a non-flammable fluorinated or non-fluorinated carbonaceous material having a LOI value of at least 40 for absorbing radiant energy, said carbonaceous material consisting of at least one of foam, film, linear and non-linear non-graphitic fibers and non-linear graphitic fibers.

2. The structure of claim 1 wherein said at least one layer comprises a woven or nonwoven web.

3. The structure of claim 2 wherein said web comprises non-linear carbonaceous fibers having a reversible deflection ratio of greater than 1.2:1 and an aspect ratio of greater than 10:1.

4. The structure of claim 1 wherein said carbonaceous fibers are electrically nonconductive.

5. The structure of claim 1 wherein said carbonaceous material comprises fibers having a carbon content of at least 85% and are electrically conductive.

6. The structure of claim 1 wherein said at least one layer comprises carbonaceous material of varying electrical resistance.

7. The structure of claim 1 wherein said at least one layer comprises a mixture of linear and non-linear carbonaceous fibers.

8. The structure of claim 7 wherein said at least one layer comprises a mixture of carbonaceous fibers and non-carbonaceous fibers.

9. The structure of claim 7 wherein said at least one layer comprises a mixture of conductive and non-conductive fibers.

10. The structure of claim 1 which is three dimensional and provides multi-angular radar absorption.

11. The structure of claim 1 wherein said at least one layer contains dipole materials or magnetic materials blended therein.

12. A camouflage structure for attenuating infrared radiation, comprising at least one flexible layer of a flexible electrically non-conductive non-flammable fluorinated or non-fluorinated carbonaceous material consisting of at least one of film, foam, linear and non-linear non-graphitic fibers and non-linear graphitic fibers, at least one flexible layer of an electrically conductive material for absorbing electromagnetic waves and means for providing a three dimensional effect for radar radiation.

13. The structure of claim 12 wherein one of said layers is comprises a woven or non-woven web of carbonaceous non-graphitic fibers.

14. The structure of claim 12 wherein one of said layers comprises a carbonaceous film or foam.

15. The structure of claim 12 including fibers and/or metallized carbonaceous fibers.

16. The structure of claim 12 wherein said carbonaceous material comprises non-linear fibers.

17. The structure of claim 12 wherein one of said layers comprises carbonaceous fibers within a thermoplastic matrix.

18. The structure of claim 12 including a layer of radar reflective material and non-carbonaceous material.

19. The structure of claim 12 including a surface cover for minimizing surface reflectivity.

20. The structure of claim 12 comprising a mixture of dipole materials within one of said layers.

21. The structure of claim 12 wherein one of said layer comprises fibers of different conductivities.

22. A camouflage material for military targets effective in the range from visible light to radar waves comprising 1) means or absorbing incident radar waves for reducing target signature and 2) at least one layer of an effective amount of radar absorbing carbonaceous material having electrical conductivity consisting of at least one of foam, film, linear and non-linear non-graphitic fibers and non-linear graphitic fibers.

23. The camouflage material of claim 22 including randomly distributed fluorinated carbonaceous fibers having semiconductive properties to absorb radar waves.

24. The camouflage material of claim 22 wherein said at least one layer comprises about 5 to 10% of the volume of fluorinated non-linear carbonaceous non-graphitic fibers in a thermoplastic matrix.

25. The camouflage material of claim 22 including an optically camouflaging paint layer.

26. The camouflage material of claim 22 wherein said carbonaceous material comprises carbonaceous fibers and natural or synthetic fibers blended with said carbonaceous fibers.

27. The camouflage material of claim 26 wherein said carbonaceous fibers are non-linear.

28. A flexible camouflage structure which provides a three dimensional effect having ignition resistant and fire resistant properties comprising at least one flexible layer of an electrically conductive non-flammable fluorinated or non-fluorinated carbonaceous material having a LOI greater than 40 for absorbing electromagnetic waves, said carbonaceous material consisting of at least one of foam, film, linear and non-linear non-graphitic fibers and non-linear graphitic fibers and means for providing differing angles for incident and reflected radar waves.

* * * * *

UNITED STATES PATENT AND TRADEMARK OFFICE
CERTIFICATE OF CORRECTION

PATENT NO. : 5,312,678
DATED : May 17, 1994
INVENTOR(S) : Francis P. McCullough, Jr. et al It is certified that error appears in the above-indentified patent and that said Letters Patent is hereby corrected as shown below:

In claim 15, column 8, line 39, after "including", delete --fibers and/or--.

In claim 22, column 8, line 57, after "means", "or" should read --for--.

Signed and Sealed this

Second Day of May, 1995

Attest:

BRUCE LEHMAN

*Attesting Officer*  *Commissioner of Patents and Trademarks*